UNITED STATES PATENT OFFICE 2,191,295

BITUMINOUS MATERIALS

Hans Dohse, Heidelberg, and Fritz Spoun, Ludwigshafen-on-the-Rhine, Germany, assignors to I. G. Farbenindustrie Aktiengesellschaft, Frankfort-on-the-Main, Germany No Drawing. Application November 27, 1936, Serial No. 113,040. In Germany December 5, 1935

8 Claims. (Cl. 106—31)

The present invention relates to materials containing bituminous substances and process of producing the same.

We have found that most valuable materials which contain bituminous substances in intimate combination with solid substances can be obtained by bringing the bituminous substances and the solid substances together in the presence of organic derivatives of ammonia containing at least one lipophilic radicle in the molecule or analogous compounds derived from phosphorus, arsenic, antimony or sulphur. While ammonia itself has no action, primary amines with lipophilic radicles, as for example laurylamine, already improve the adherence of the binding agent to stone. Still more advantageous are derivatives of ammonia which have several substituents on the nitrogen. At least one of them is preferably a lipophilic radicle, as for example an alkyl radicle of high molecular weight. The presence of aromatic radicles may also be of advantage. The hydrocarbon radicles may also carry substituents, for example they may contain halogen.

Compounds derived from pentavalent nitrogen, as for example quaternary ammonium compounds containing at least one lipophilic radicle, have an excellent action. For example the said organic derivatives may be very advantageously used in the coating of substrata of stones or concrete, as for example stone pavings, concrete roads, road surfaces, embankment slopes, aerodromes and other ground attachments, building foundations, floorings, pillars and embankments, and also for ship bottoms, parts of bridges or sluices, piers, dams, T-girders, railway ties or sleepers, tubular conduits, turbine chambers, concrete slopes, canals, silo buildings, cables and the like. In particular, rusty and even moist rusty iron parts may be coated very smoothly and uniformly with butuminous masses by the use of the said additional substances and thereby continually protected from further injury by external influences especially moisture and any kind of corrosion.

Especially bituminous road constructional materials may be prepared in a very advantageous manner with the aid of the said compounds from bituminous binding agents and rock or stones of a great variety of kinds. While rocks and stones of basic character, such as limestone, magnesite and clays, are by nature up to a certain degree hydrophobic and may therefore be combined comparatively readily with bituminous binding agents, rock and stone varieties of acid character, such as granite and porphyry, are generally speaking hydrophilic and can only be combined with bituminous binding agents with difficulty. In the case of rock and stone of the latter kind, it is especially important to add substances which facilitate the combination of the two components.

Road constructional materials are prepared for example by bringing together hydrophilic varieties of rock or stone, such as porphyry, syenite, basalt, trass and the like which have excellent hardness, great resistance to compression and stability to weathering influences, and suitable bituminous binding agents, as for example tar or asphalt, in the presence of the said additional materials. The latter may be used in varying amounts which depend on the nature of the other components of the constructional material. For example a few per cent of additional substance, calculated with reference to the binding agent, may be used but generally speaking even amounts of about 1 per cent or less are sufficient. By reason of the presence of the additional substances, complete and uniform combination of the rock or stone with the bituminous binding agent takes place readily. The resulting road constructional materials retain their favorable properties permanently even under the influence of variations in the weather.

The combination of the rock or stone with the binding agent and the additional substance may be effected in different ways. The said materials may be brought together simultaneously while thoroughly mixing them or the rock or stone may first be mixed with the binding agent and the additional substance then added, whereupon by further mixing the desired good combination of the components is effected. The additional substances may, however, first be applied to the rock or stone which is then mixed with the binding agent; when the additional substances are used in the dissolved form or in suspension in liquids, a drying may be carried out before the binding agent is added. The rock or stone may also be mixed with a solution or dispersion of the additional substances in the binding agent.

The process may also be used with advantage for the working up of basic rock or stone, in particular such as contains considerable admixtures of acid rock or stone. There is in particular also the advantage that even binding agents containing large amounts of water, as for example emulsions, as well as moist rock or stone, can be readily brought to adhesion. Furthermore, working in wet weather, which otherwise is frequently difficult, offers no difficulty.

The nature of the road constructional material may be varied in the desired manner by the addition of flux oils or substances increasing the viscosity or by chlorination of the bituminous binding agent or, when the latter is used in the form of an emulsion, by the addition of emulsifying agents or by other similar measures.

The said substances may also be very advantageously used in filling grooves, such as occur for example in the construction of concrete roads, or sockets of tubular conduits with bituminous substances. The procedure in this case may be for example that the organic derivatives of ammonia and the like are mixed with the bituminous filling material or the grooves and other intermediate spaces are previously painted or sprayed with solutions of the said substances and the bituminous filling compositions subsequently introduced. In all the said cases an excellent adhesion of the bituminous masses to the other solid substances is effected which, in particular, resists even the action of moisture.

If it is desired to prepare coatings under water, it is advantageous to use as fluxing agents diglycol ethers or similar substances which are soluble both in bitumen and water.

The general prescriptions for preparing, rendering stable and using emulsions may also be used in the emulsification of bitumen in the presence of the adhesives. Thus for the preparation of the emulsions it is advantageous to use rapidly rotating turbine stirring mechanism, disintegrators and turbo mixers; furthermore in order to obtain optimum working conditions in the case of asphalt bitumen emulsions, it is often preferable to maintain a pH-value below 5, advantageously between 2 and 3. It is also possible, by the addition of substances which have the character of protective colloids, to stabilize the emulsions and also to render them suitable for working up together with filler materials having large surfaces. Finally by using more or less readily volatile bitumen solvents, a good stability to frost and an increased lubricating property of the freshly prepared bitumen on the stone are obtained; this is advantageous in the rolling-in process in road construction and is necessary for the complete coating and covering of porous concrete surfaces.

If cation-active compounds containing lipophilic or lipophilic and hydrophilic groups, as for example quaternary ammonium, phosphonium, arsonium or stibonium compounds or ternary sulphonium compounds or salts of amines which contain aliphatic radicles of high molecular weight, or mixtures of such compounds be used as additional substances, especially advantageous results are obtained. The additional substances, which generally speaking have a polar-non-polar molecular structure, will hereinafter for the sake of brevity be referred to as "adhesives". As suitable substances of this kind may be mentioned for example quaternary ammonium chloride in the molecule of which two methyl groups, 1 benzyl group and 1 lauryl group are attached to the nitrogen atom, as well as the corresponding compounds which instead of the benzyl group contain a further methyl group or an ethyl or hydroxyethyl group, or instead of the lauryl group contain an oleyl or stearyl group. Compounds of the type of dimethylhydroxyethyldodecylammonium hydroxide and the oleic acid ester of benzyl diethylhydroxyethylammonium chloride also give good results. Trimethyl-lauryl-phosphonium chloride and diethyl-oleyl-sulphonium hydroxide, for example, may also be mentioned as suitable "adhesives". Further suitable "adhesives" are for example dimethyl-benzyl-lauryl-ammonium chloride, dimethyl-benzyl-octodecyl-ammonium chloride, the methylsulphuric acid salt of trimethyl-octodecyl-ammonium, the oleic acid ester of hydroxyethyl-pyridinium chloride, dimethyl-palm-kernel-fatty-amine or its hydrochloric, sulphuric, tartaric, phosphoric or citric acid salts, the oleic acid ester of benzyl-hydroxyethyl-morpholinium chloride, dimethyl-hydroxyethyl-stearyl-ammonium hydroxide and the oleic acid ester of triethanol-benzyl-ammonium chloride, and also the products obtainable by the reaction of colophony and pyridine in the presence of ethylene oxide, chlorethyl glycol, chloracetic acid and the like, or the reaction products of trichloro-hard-paraffin with dimethylamine in the presence of benzyl chloride or dimethyl sulphate, and also abietinylamine, naphthylamine and tetrahydro-naphthylamine.

Polyethylene amines or their alkylated, hydroxyalkylated or acylated derivatives may also be mentioned, especially those containing more than 8 carbon atoms in the molecule. They may also be used in the form of their salts, for example with hydrochloric, sulphuric, acetic, tartaric, citric or phosphoric acids. The reaction products of the said amines with benzyl chloride or dimethyl sulphate, in which the nitrogen is pentavalent, are also suitable. Substances having unsaturated fatty chains are also suitable, but saturated substances should usually be given the preference by reason of their greater stability to heat.

Especially valuable substances favoring the intimate combination of bituminous substances and substrata of the kind mentioned above are such as reduce the surface tension between the material to be coated and the bituminous substance under water. Whether or not a substance will reduce the surface tension between the material to be coated or sticked and the bituminous substance under water and will therefore be a suitable adhesive for the process according to this invention may readily be determined by determining the angle of contact between the material to be coated and the bituminous substance under water in the presence and absence of the additional substance concerned. If the angle of contact in the presence of the substance is appreciably reduced, the said substance is suitable as an adhesive. In the determination of the angle of contact it is not necessary to use that bituminous substance and that material which are to be used in practice. On the contrary, the said bodies may be replaced by other bodies having a similar behaviour; thus, for example a plate of marble may be used instead of limestone chips, a quartz plate instead of acid stones and paraffin oil instead of the bituminous substances to be used in practice. For example if it has been determined with the aid of the angle of contact method that a certain substance is a suitable adhesive for the system paraffin oil-quartz plate, it may be directly stated that this substance is also an adhesive for bitumen and other acid materials, such as quartz porphyry and the like.

The determination of the angle of contact is advantageously carried out in the following manner: A drop of paraffin oil is allowed to flow on a marble plate or the like under water, the angle of contact between the paraffin oil drop and the substratum being determined. The experiment is repeated with paraffin oil to which the substance to be tested has been added, for example in an amount of from 0.1 to 5 per cent, the angle of contact being again determined. If the angle of contact in this case is appreciably less than in the first case, the substance tested is an adhesive. Instead of bringing the drop of paraffin oil onto the substratum under water, it may also be first applied to the substratum and the latter then laid in water.

The following examples will further illustrate the nature of this invention but the invention is not restricted to these examples. The parts are by weight.

Example 1

The concrete foundation of a building is coated with a mixture of 80 parts of the bitumen obtainable in commerce under the name "Mexphalt" and 20 parts of benzene first runnings to which have been added 2 parts of the quaternary ammonium compound of the following formula:—

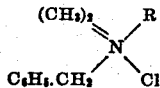

in which R is the alkyl radicle of the alcohols obtainable by the reduction of palm kernel fatty acids. The coating is applied to the still moist substratum before the complete setting of the cement and immediately after removing the planking. It combines extremely well with the substratum. An excellent insulation of the foundation against moisture is thus obtained and it may therefore be directly covered with earth after coating.

Example 2

The surface of a freshly-made concrete road covering is coated after a short setting with a layer of a mixture of 78 parts of 60/40 road tar, 20 parts of asphalt bitumen having a softening point of 45° C. (according to Kraemer-Sarnow) and 2 parts of diethylhydroxyethylbenzylammonium chloride oleic acid ester. The advantage of the said manner of working consists in particular in the fact that the upper layer can be already applied to the still moist cement and its adhesion is not injured or impaired by any external moisture influences, such as ground water, rain and the like.

Example 3

A concrete road is prepared in the usual way without special measures being taken for the protection of the cracks or grooves. When sand, earth or the like has collected in the grooves, it is removed by simple spraying by means of water. The grooves, without drying, are then immediately painted with a bituminous coating mass which contains from 1 to 2 per cent by weight of the oleic acid ester of ethanol-pyridinium chloride. The bituminous pouring mass is then poured into the grooves. The groove castings adhere very firmly to the walls of the grooves.

Example 4

A pipe for water or gas is laid in the usual manner. The tubes are, however, not derusted with the aid of a sand-blast before coating with bitumen, as is otherwise usually the case, but are directly painted with the bitumen which has been rendered liquid and to which 3 per cent of oleylamine acetate have been added. The bitumen mass used for filling the sockets also has the said addition.

Example 5

2 parts of the quaternary ammonium chloride having the formula:

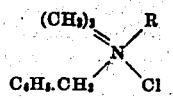

in which R is the alkyl radicle of the alcohols obtainable by the reduction of palm kernel fatty acids are dissolved in 100 parts of 60/40 road tar. 100 parts of porphyry chips having a grain size of from 5 to 8 millimeters are intimately mixed with 5 parts of the above mentioned solution. There is thus formed a road constructional material in which the stone constituent is well combined with the binding agent. Road surfaces prepared with this material are extremely durable.

If a sample of the said material be allowed to remain under water for three days, no loosening of the bituminous binding agent from the stone takes place. Even by treatment with water at temperatures up to 75° C., the material remains unchanged.

If on the other hand a road constructional material be prepared in a corresponding manner but without the addition of the said quaternary ammonium compound, it has only an unsatisfactory stability. When allowed to stand under water, only about half of the stone constituent is covered with binding agent even after the course of the first day and on being allowed to stand further and also on being treated with water at temperatures up to 75° C. an almost complete separation of the binding agent from the stone takes place.

Example 6

100 parts of porphyry chips having a grain size of from 5 to 8 millimeters are sprayed and completely moistened by mechanical mixing with 2 parts of a hot 5 per cent solution in water of the amine obtainable by the saponification of whale oil, partial hydrogenation of the resulting acids, conversion of the hydrogenated acids into the nitriles and hydrogenation. The moistened porphyry chips are mixed with suitable amounts of an asphalt bitumen known under the same "Spramex 300" (having a softening point according to Kraemer-Sarnow of about 20° C.) which has been rendered capable of being worked in the cold by the addition of 20 per cent benzene first runnings. There is thus readily formed a uniform coating of bitumen on the stone which undergoes scarcely any change even after standing for 8 days under water, even when the temperature is temporarily raised to 75° C.

If the same procedure is followed in the absence of the said amine, only a bad combination of the bitumen with the stone takes place. Even after standing for three days under water at ordinary temperature, such a coating of bitumen is entirely loosened from the stone.

Example 7

25 parts of a 60/40 road tar are mixed at ordinary temperature with 2.5 parts of benzene first runnings and 0.5 part of the oleic acid ester of hydroxyethylated pyridinium chloride. 500 parts of moistened Dossenheimer porphyry chips having a grain size of from 5 to 8 millimeters are mixed with the above mixture. In spite of the fact that the stone is moist, it forms with the binding agent readily a uniform firmly cemented road constructional material which is stable even when allowed to stand under water under the conditions specified in Example 6. A road constructional material prepared without the said addition in an otherwise similar manner shows loosening of the binding agent even after having been allowed to stand under water for a short time.

Instead of the said oleic acid ester there may be used with a similar result equal amounts of polyhydroxyethylated octodecenylamine or octodecylamine, tetraethanolammonium stearate or a product obtained by the action of octodecenylamine on a polyethylenepolyamine having a molecular weight between 250 and 300 and chloracetic acid.

Examle 8

1000 parts of limestone or porphyry chippings are spread out and covered to a height of from 2 to 3 centimeters with a 0.2 per cent aqueous solution of the quaternary ammonium chloride of the formula:

in which R is the alkyl radicle of the alcohols obtainable by the reduction of palm kernel fatty acids. There are then added 50 parts of a bitumen known under the name "Spramex 200" (softening point about 25° C.) which has been rendered liquid and capable of being worked in the cold by the addition of 20 per cent of benzene first runnings. By thorough stirring round, a uniform well adhering coating of bitumen is gradually formed on the stone particles whereby a good road constructional material is formed. The material undergoes no change even when allowed to remain under water for several weeks.

If water be used instead of the said aqueous solution, no wetting and coating of the stone by the bitumen takes place by stirring round, even if heat is applied.

Instead of the said additional substance there may also be used a condensation product derived from 5 molecular proportions of water-soluble polymerized ethylene-imine and 1 molecular proportion of the mixture of alkyl bromides corresponding to palm kernel fatty acids.

Example 9

1000 parts of granular quartz which consists of practically pure hydrated silica and which has a grain size of from 10 to 15 millimeters is moistened and then thoroughly mixed with 60 parts of a bitumen known under the name of "Mexphalt E" (softening point about 40° C.) which has been rendered capable of being worked in the liquid state in the cold by the addition of 20 per cent of benzene first runnings. Before use, there are added to the bitumen about 1.5 per cent of its weight of the acetate or chloride of a fatty amine, for example the amine mixture obtainable by the partial hydrogenation of the acids contained in whale oil, conversion into the nitriles and reduction. Even by shovelling over, the material forms a well adhering road constructional material. The stone and bitumen remain intimately combined even when water is added to the resulting bituminous road constructional material.

If the same procedure be followed in the absence of the said additional substance, only a bad coating of the stone takes place from the start and the coating is practically completely loosened again by the addition of water.

Example 10

500 parts of chippings of an East-Prussian erratic stone are uniformly moistened with about 15 parts of water and mechanically mixed with 30 parts of a mixture consisting of 85 per cent of the bitumen known under the name of "Mexitumen" (softening point from 25° to 30° C.), 13 per cent of benzene first runnings and 2 per cent of the acetate of the amine mixture obtained by partial hydrogenation of whale oil fatty acids, conversion of the resulting acids into nitriles and reduction. By simple mixing it is possible to obtain in a few minutes a uniform well-adhering coating of bitumen on the stone. If water, even in great excess, as for example 1000 per cent, is present during the preparation or later, the adhesion of the binding agent to the chippings is practically undiminished. If the same procedure is followed without the addition of the said amine acetate the film of bitumen first formed on the stone becomes loosened again in a few minutes after the benzene first runnings used as a diluent have volatilized. By adding water, the bitumen fraction is separated to a great extent from the stone and a cementing of the parts with the formation of a permanently useful road constructional material does not take place.

Example 11

50 parts of a 65/35 road tar are heated for 20 minutes with 1 part of a quaternary ammonium base having the formula:

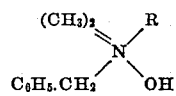

in which R is the alkyl radicle of the alcohols obtainable by the reduction of palm kernel fatty acids, and then thoroughly mixed with 1000 parts of a quartz porphyry having a grain size of from 5 to 8 millimeters. After allowing the product to remain under water for 30 days, the temperature being periodically raised to 50° C. and temporarily even to 75° C., the grains of the chippings which are completely coated with tar are still firmly cemented together.

If the same procedure be followed in the absence of the said ammonium base, the binding agent certainly coats the stone constituent; when the material is stored at ordinary temperature under water, however, the edges of the stone material appear even after one day and by heating to 50° C. the tar also separates partly from the surfaces of the chippings.

Example 12

500 parts of so-called crushed gravel dredged from the Rhine and having a grain size of about 5 millimeters are wetted with a solution of 0.075 part of the oleic acid ester of ethanol-pyridinium chloride in 10 parts of a volatile solvent, as for example benzene first runnings. After the solvent has evaporated, there remains an extremely thin layer of the said compound on the stone. The product is mixed in a mixing drum heated to 160° C. with 25 parts of an asphalt bitumen, for example that known under the name "Spramex 300" (softening point 20° C.). The formation of a durable road constructional material which remains uniform takes place.

Example 13

300 parts of basalt having a grain size of from 5 to 8 millimeters are mixed with 100 parts of the same material having a grain size of from 16 to 20 millimeters. The mixture is sprayed with 12 parts of a 0.5 per cent aqueous solution of the oleic acid ester of ethanol-diethyl-benzyl-ammonium chloride in which there is also dissolved about 1 per cent of magnesium chloride in order to prevent freezing at the prevailing temperature of from 1° to 2° below zero C. The spread-out moist stone is thoroughly mixed in rain and snow-storm by shovelling over with 28 parts of a mixture of 30 parts of "Spramex 300" having a softening point of 20° C. and 30 parts of petroleum ether. Even after shovelling over twice, the stone is well coated with the binding agent and may be directly rolled out on a levelled macadam surface. Road surfaces constructed of the said material and finished off in the usual manner have an excellent stability, resistance to water and capacity for gripping of the surface.

Example 14

2000 parts of quartz porphyry having a grain size of from 5 to 8 millimeters and 100 parts of the asphalt bitumen known under the name "Mexphalt E₁" (dropping point from 56° to 57° C.) are introduced into a 0.5 per cent solution of the quaternary ammonium compound having the formula:

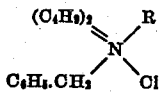

in which R is the alkyl radicle of the alcohols obtainable by the reduction of palm kernel fatty acids, while stirring, the temperature being kept above the dropping point of the bitumen, for example at from 95° to 100° C. The stone particles, by reason of their movement by the stirring means, are completely and uniformly coated by the bitumen, whereby a good road constructional material is formed which remains stable for practically any length of time even when stored in water.

The unused part of the solution of the quaternary ammonium compound may be further used until exhausted or that which has been used may be replenished.

Example 15

2 parts of the acetate of the quaternary ammonium base specified in Example 11 are added to a mixture of 78.4 parts of the bitumen known under the name "Mexphalt E₁", 18 parts of asbestos powder and 3.6 parts of asbestos fibres, for example by mixing the acetate with the mass which has been heated to 120° C. and which at the said temperature is mobile and capable of being poured.

The resulting road constructional material is very stable. If it be tested according to the directions given in the publication "Teer und Bitumen", 1935, pages 78 to 81, and 91 to 95, the formation of cracks in balls formed from the material 50 grams in weight and cooled for 4 hours at 13° below zero C. when they are allowed to fall onto a steel plate lying on the ground first occurs when the distance fallen is 17 meters. The composition is eminently suitable for road constructional purposes; it may also be used in particular for filling grooves in concrete, stone and plaster.

A mixture of the said kind without the addition of the said quaternary ammonium compound, when tested in the manner described, shows the formation of cracks when the distance through which the balls fall is only 10 meters.

Example 16

A mixture of 0.2 part of a bitumen having a softening point of 41° C. (according to Kraemer-Sarnow) with 0.004 part of methyl sulphuric acid trimethyloctodecylammonium salt is thoroughly mixed at 200° C. with 3 parts of porphyry chips having a grain size of from 5 to 8 millimeters and 1 part of porphyry gravel having a grain size of from 0.2 to 2 millimeters. A broken stone basis of melaphyre is supplied with a layer of the mixture described above which has been heated, the said layer being about 3 centimeters in thickness; the layer is intensely rolled at once. After applying a layer of porphyry chips a road covering of excellent stability and capacity for gripping of the surface is obtained.

Example 17

Swedish granite chips having a grain size of from 0.2 to 0.6 millimeter are mixed with a bitumen having a softening point of 20° C. (according to Kraemer-Sarnow) and containing 0.5 per cent of tetrahydronaphthylamine

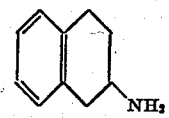

in a proportion of 71 to 29 parts by volume. If the material obtained is tested according to the prescriptions in the "Din-Norms 1995" an adhesion value of 9 is found, while the corresponding value of a material produced in an analogous manner without the addition of tetrahydronaphthylamine is only 1.

Instead of the said tetrahydronaphthylamine the corresponding compound bearing the amino group in the α-position of the hydrogenated nucleus may also be employed, if desired, in the form of its hydrochloric or acetic acid salt.

The said materials prepared with the addition of the amino compounds are excellently suitable for making road-coverings.

Example 18

A concrete wall which is still wet and from which the planking has just been removed is painted with a solution of an asphalt bitumen (softening point according to Kraemer Sarnow 45° C.) containing 1 percent of dimethyl ethanol dodecylammonium hydroxide and 0.5 per cent of octodecyl triphenylphosphonium bromide. A very well adhering coating is thus produced which also penetrates into the pores of the wall and isolates very well.

Instead of the said ammonium hydroxide a similar quaternary ammonium compound can be employed which instead of the dodecyl radicle contains the radicles corresponding to the alcohols obtainable by reducing palm kernel fat.

Example 19

A leaking concrete water-container is internally coated with a mass consisting of 100 parts of asphalt bitumen (softening point 55° C.), 25 parts of dioxane and 2 parts of a product obtainable by reacting trichlor-hard-paraffin wax with dimethyl amine and condensing the reaction product with benzyl chloride. It is not necessary to allow the container to dry before the coating is applied but leaking is also completely stopped when the container is wet or even filled with water during the application of the coating.

Example 20

A drop of paraffin oil is applied to a quartz plate; by introducing the plate into water the drop assumes almost a spherical form. The angle of contact is about 180°, as is indicated by the spherical form of the drop of paraffin oil under water. If the angle of contact be determined in the same way with paraffin oil to which from 0.5 to 1.0 per cent of dimethyl-benzyl-octodecyl-ammonium chloride has been added, the angle of contact is found to be only about 20°, i. e. considerably lowered as compared with paraffin oil alone or paraffin oil with the admixture of inactive substances.

It results that the tested compound is a good adhesive which strongly increases the adhesive power of bituminous substances to acid stones.

If 1 per cent of dimethyl-benzyl-octodecyl-ammonium chloride be added to petroleum pitch which is liquid when cold, the adhesive power of the petroleum pitch to acid stones is considerably increased. The increase is so great that even strongly hydrophilic quartzite may be completely surrounded with the petroleum pitch while in a dripping wet state, while the same material without the addition of the adhesive can only be used for the preparation of bituminous road constructional materials with the aid of the said stone with quite unsatisfactory results. Other asphalts or tars may also be improved with the said adhesive instead of petroleum pitch.

Example 21

The angle of contact on a glass plate of a drop of paraffin oil to which 0.5 per cent of stearylamine acetate has been added is determined under water in the manner described in Example 20. As compared with paraffin oil without any addition, the angle of contact is reduced by about 150°.

If 0.5 part of stearylamine acetate be added to 100 parts of 60/40 anthracene oil tar which is diluted with 10 per cent of benzene, a material is obtained which can be applied without difficulty even to moist porphyry chippings and thereby forms a good road constructional material.

Example 22

A drop of paraffin oil to which 1 per cent of dimethyl-hydroxyethyl-palm-kernel-fatty-ammonium hydroxide has been applied and which has been applied to a plate of marble shows under water an angle of contact of about 10°, while the angle of contact of the paraffin oil without the addition of adhesive is about 180°.

3000 parts of asphalt-bitumen (softening point 35° C. according to Kraemer-Sarnow) are mixed at 100° C. while stirring vigorously with 1000 parts of water containing 30 parts of the methyl-sulphuric acid salt of trimethyl-octodecyl-ammonium. The resulting emulsion is diluted with 500 parts of toluene. The mixture which is mobile at ordinary temperature may be directly painted onto moist concrete walls and withstands an immediate spraying with water.

Example 23

A mixture of 300 parts of petrol pitch heated to 70° C. (softening point 27° C. according to ring and ball) and 15 parts of benzene is allowed to flow into a solution of 3 parts of the trimethyl-octodecyl-ammonium methyl-sulphate in 100 parts of water contained in a turbo mixer. After mixing for a short time in the turbo mixer, about 415 parts of an emulsion are formed which is eminently suitable for coating purposes and for road construction.

Example 24

A mixture, heated to 60° C., of 300 parts of asphalt-bitumen (softening point 35° C. according to ring and ball), 20 parts of ethylene chloride and 3 parts of dimethyl-benzyl-octodecyl-ammonium chloride is allowed to flow while stirring into 105 parts of water contained in a closed vessel having a rapidly-rotating stirrer. An asphalt emulsion eminently suitable for road constructional purposes is obtained.

Example 25

300 parts of a bitumen (softening point 34° C. according to ring and ball) heated to 100° C. are allowed to flow while stirring vigorously into 140 parts of water containing 4 parts of dimethyl-hydroxyethyl-lauryl-ammonium hydroxide. After the emulsion has cooled to about 45° C., 20 parts of methylene chloride are allowed to flow in while continuing the stirring. The resulting emulsion is eminently suitable for coating road concrete, moist metallic walls and the like.

Example 26

A mixture of 1000 parts of bitumen (softening point 40° C. according to Kraemer-Sarnow) and 5 parts of the reaction product of trichlor-hardparaffin wax with dimethylamine and dimethyl sulphate is allowed to flow in the presence of a rotating turbo-stirrer into 1000 parts of water containing 5 parts of the reaction product of abietinylamine with chlorethyl-glycol and pyridine. A firmly adhering emulsion is obtained which is eminently suitable for road constructional and coating purposes.

Example 27

An asphalt bitumen (softening point 47° C. according to ball and ring) heated to 180° C. is allowed to flow into a solution of 30 parts of the stearic ester of benzyl-hydroxy-ethyl-morpholinium chloride and 10 parts of glue from hides in 1000 parts of water contained in a rapidly rotating stirring mechanism. An emulsion eminently suitable for coating and road constructional purposes is obtained after a few minutes.

Example 28

1000 parts of an asphalt bitumen (softening point 45° C. according to Kraemer-Sarnow) which have been heated to 180° C. are allowed to flow in a turbo-mixer into a mixture of 1000 parts of water, 15 parts of methyl sulphuric acid trimethyloctodecylammonium salt, 10 parts of tartaric acid and 3.3 parts of pulverulent glue from hides. A homogeneous emulsion is obtained in a short time.

On a highway a layer of broken stone which has not been freshly applied is thoroughly cleaned with a Piassava besom and coated with 0.5 kilogram per square meter of the above emulsion. Then per each square meter a mixture of 2 liters of the said emulsion and 40 liters of a mixture (consisting of 17 liters of porphyry grains having a diameter of from 8 to 12 millimeters, 15 liters having a diameter of from 5 to 8 millimeters, 8 liters having a diameter of from 3 to 5 millimeters) is applied to the said layer of broken stone and after some minutes stamped down and rolled. After 1 hour a covering layer of gravel having a diameter of from 3 to 5 millimeters containing 2 per cent of the said emulsion (calculated on the weight of the gravel) is applied to the said basis, stamped down and rolled. After a few hours the said covering layer has become resistant towards rain, no separation of bituminous parts taking place.

Example 29

1000 parts of a 70/30 anthracene oil tar heated to 100° C. are allowed to flow slowly while intensely stirring into a mixture of 1000 parts of water, 12 parts of dimethylbenzyloctodecylammonium chloride, 10 parts of phosphoric acid, 4 parts of gelatin and 50 parts of ethylene chloride. A tar emulsion is thus obtained which is especially suitable for coating concrete surfaces and has no tendency to form lumps. The coatings obtained therewith dry rapidly and are very resistant to water.

Example 30

1000 parts of an asphalt bitumen (drop point 60° C. according to Ubbelohde) are intensely mixed in a disintegrator with a solution of 1.5 parts of sulphuric acid, 8 parts of the oleic acid ester of benzyl ethanol morpholinium chloride and 4 parts of maize starch in 1000 parts of water. By means of the mixture obtained valuable protecting coatings may be produced on wet stone, concrete and wood surfaces which already after 1 hour are completely resistant to water.

Example 31

1000 parts of an asphalt bitumen (softening point 45° C. according to Kraemer-Sarnow) are allowed to flow into 1000 parts of water containing 12 parts of dimethyl-benzyl-palm-kernel oil ammonium chloride and 4 parts of glue from hides while mixing thoroughly. An emulsion is obtained which has a pH-value of about 5.0 and which may be employed in the production of road surfaces.

The stability of the emulsion may be improved considerably by adding 6 parts of concentrated sulphuric acid during the preparation. In this case the emulsion has a pH-value of about 1.7. It is possible in this way to produce stable emulsions even with asphalt bitumina having higher softening points than 45° C. The said improvement of the emulsions by lowering the pH-value may be produced by the addition of any inorganic or organic acids or acid reacting salts.

What we claim is:

1. The process for the production of road-building materials containing bituminous substances in intimate combination with solid substances which comprises bringing the said bituminous substances and the said solid substances together in the presence of an "adhesive" selected from the group consisting of cation-active organic derivatives of ammonia containing at least one lipophilic radical directly attached to a nitrogen atom of said ammonia derivative by means of a nitrogen to carbon bond and the analogous compounds derived from phosphorus, arsenic, antimony and sulphur.

2. Road-building materials comprising in intimate combination a bituminous substance, a solid substance and an "adhesive" selected from the group consisting of cation-active organic derivatives of ammonia containing at least one lipophilic radical directly attached to a nitrogen atom of said ammonia derivative by means of a nitrogen to carbon bond and the analogous compounds derived from phosphorus, arsenic, antimony and sulphur.

3. The process for the production of materials containing bituminous substances in intimate combination with solid substances which comprises bringing the said bituminous substances and the said solid substances together in the presence of a cation-active quaternary ammonium compound containing at least one lipophilic radicle of the group consisting of aliphatic, cyclo-aliphatic and aliphatic aromatic radicles directly attached to a nitrogen atom of said quaternary ammonium compound by means of a nitrogen to carbon bond.

4. The process for the production of materials containing bituminous substances in intimate combination with solid substances which comprises bringing the said bituminous substances and the said solid substances together in the presence of a cation-active amine containing at least one lipophilic aliphatic ester radicle directly attached to a nitrogen atom of said amine by means of a nitrogen to carbon bond.

5. Materials comprising in intimate combination a bituminous substance, a solid substance and a cation-active quaternary ammonium compound containing at least one lipophilic radicle of the group consisting of aliphatic, cyclo-aliphatic and aliphatic aromatic radicles directly attached to a nitrogen atom of said quaternary ammonium compound by means of a nitrogen to carbon bond.

6. Materials comprising in intimate combination a bituminous substance, a solid substance and a cation-active amine containing at least one lipophilic aliphatic ester radicle directly attached to a nitrogen atom of said amine by means of a nitrogen to carbon bond.

7. Road-building materials comprising in intimate combination a bituminous substance, a solid substance and a cation-active quaternary ammonium compound containing at least one lipophilic radicle of the group consisting of aliphatic, cyclo-aliphatic and aliphatic aromatic radicles directly attached to a nitrogen atom of said quaternary ammonium compound by means of a nitrogen to carbon bond.

8. Road-building materials comprising in intimate combination a bituminous substance, a solid substance and a cation-active amine containing at least one lipophilic aliphatic ester radicle directly attached to a nitrogen atom of said amine by means of a nitrogen to carbon bond.

HANS DOHSE.
FRITZ SPOUN.